Figure 1:
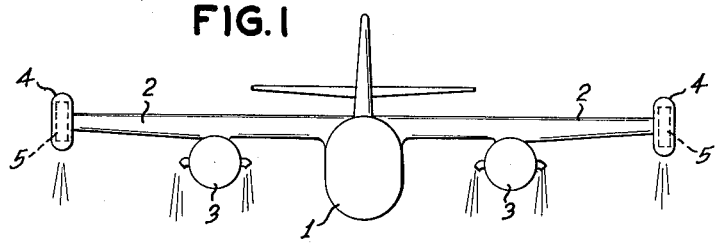

April 12, 1966  A. BUCHSTALLER  3,245,638

CONTROL OF VERTICAL TAKE-OFF JET AIRCRAFT

Filed June 28, 1963

*INVENTOR.*
ANTON BUCHSTALLER

BY James E. Bryan

ATTORNEY

United States Patent Office 3,245,638
Patented Apr. 12, 1966

1

3,245,638
CONTROL OF VERTICAL TAKE-OFF JET
AIRCRAFT
Anton Buchstaller, Friedrichshafen, Germany, assignor to Dornier-Werke, G.m.b.H., Friedrichshafen, Germany, a corporation of Germany
Filed June 28, 1963, Ser. No. 291,424
Claims priority, application Germany, July 3, 1962, D 39,286
6 Claims. (Cl. 244—12)

This invention relates to VTOL aircraft which, during take-off and landing, are supported on the downwardly directed gas jets of jet propulsion units. Several forms of construction of such aircraft are known and in one arrangement, the same jet propulsion units are employed for the generation of the vertical and the forward thrust. The propulsion units in such a construction are pivotable so that the gas jets may variably emerge either rearwardly or downwardly, with respect to the aircraft fuselage. Other forms of construction are known in which the propulsion units are fixedly mounted and are provided with deflection means for the gas jets. Such deflecting means may be pivotable outlet nozzles which are arranged laterally of the propulsion units.

During vertical take-off and landing, the propulsion units must support the total weight of the aircraft and, in addition, must have an excess thrust. During level flight, on the other hand, such a high thrust output is generally not required of the propulsion units. For this reason, special vertical propulsion units have been employed which are operative for only a limited period of time and which are inoperative during level flight.

Various forms of construction and design of aircraft using such special vertical propulsion units are known. The vertical propulsion units are usually provided with a plurality of jets and generate the required vertical thrust alone or they may be used in addition to the thrust of the main propulsion units when the latter are provided with pivotal nozzles, whereby the main units also may be employed for vertical flight. It is customary to mount the vertical propulsion units symmetrically to the longitudinal axis of the aircraft on both sides thereof. They may be accommodated in the fuselage or in the wings of the aircraft or, if desired, in special engine nacelles.

Malfunctioning or failure of the jet propulsion units presents a serious problem during VTOL operations and considerable danger results therefrom. In such cases, not only is the loss of thrust an important factor but also the thrust asymmetry resulting therefrom. Rolling moments of the aircraft are produced due to the thrust asymmetry on both sides of the aircraft which becomes particularly dangerous if long lever arms are involved, i.e., if the vertical propulsion units are arranged in nacelles on the wing tips. The thrust asymmetry can be compensated to a certain narrowly limited extent by existing control means, e.g. by throttling and increasing the output and efficiency of the properly functioning propulsion units. If, however, the thrust of one of the vertical propulsion units is decreased substantially, or if it becomes completely inoperative, then the asymmetry can no longer be compensated or equalized by the existing control means. In such cases, therefore, the propulsion unit which is positioned symmetrically to the inoperative propulsion unit, relative to the longitudinal axis of the aircraft, has been disconnected or rendered inoperative. This results, however, in an increased loss of thrust which should be avoided if possible. A relief or emergency system has also been provided, the system comprising connecting channels between the vertical propulsion units. When, in such an arrangement, one of the propulsion units is inoperative or malfunctions, the remaining thrust of the other propulsion unit is distributed approximately symmetrically to both sides of the aircraft. Such a relief or emergency system cannot be employed, however, in special vertical propulsion units which are provided in a greater number and are generally positioned in the wing tips.

The present invention eliminates the dangerous rolling moments, resulting from malfunctioning of a vertical propulsion unit, without additional loss of thrust and is particularly valuable in those cases where the vertical propulsion units are mounted in the wings, specifically in nacelles in the wing tips. Further, by the present invention, the thrust symmetry can be re-established. In the construction of the present invention, at least one container is provided adjacent each vertical propulsion unit and these containers may be jettisoned in case of a malfunction or failure of a vertical propulsion unit. The containers may be jettisoned in such numbers that the rolling moment created is compensated by the weight of the jettisoned container or containers. The number of the containers may correspond to the number of vertical propulsion units and the weight of the containers, including the contents thereof, may correspond in each case to the thrust produced by one vertical propulsion unit where the vertical propulsion units are employed in addition to primary propulsion units having pivotal nozzles. The containers may also be provided in a number exceeding that of the vertical propulsion units whereby the weight of the container and its contents is less than the thrust generated by one propulsion unit. The arrangement and number of the containers is made in practice according to the specific aircraft design. The containers are advantageously mounted in close proximity to the vertical propulsion units, for example, in a single nacelle or in two nacelles mounted adjacent each other. The containers may, however, be mounted at other places on the aircraft frame.

Figure 2:
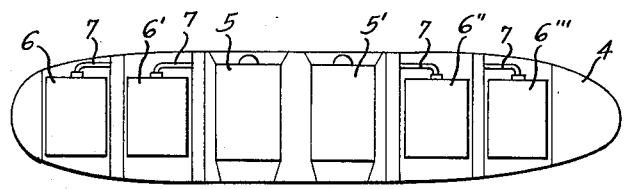
Figure 3:
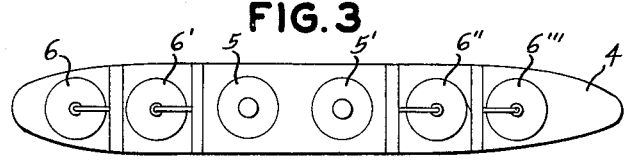
Figure 4:
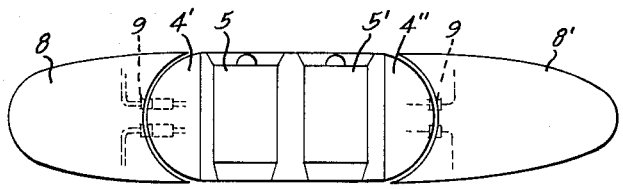
Figure 5:
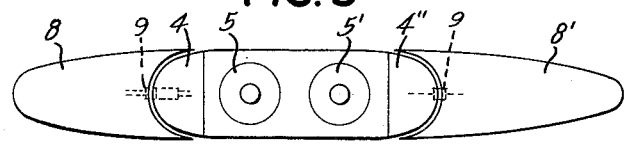

The present invention will be further illustrated by reference to the accompanying drawings in which:

FIGURE 1 is a schematic illustration showing the mounting of the vertical propulsion units on an aircraft as viewed from the front, FIGURE 2 is a side view of one arrangement of the vertical propulsion units and containers in a single nacelle, FIGURE 3 is a plan view of the nacelle shown in FIGURE 2, FIGURE 4 is a side view of another embodiment of vertical propulsion units and containers mounted in a separable nacelle, and FIGURE 5 is a plan view of the nacelle of FIGURE 4.

Referring to FIGURE 1, a jet aircraft having a fuselage 1 and the wings 2 is shown having main jet propulsion units 3 which are mounted under the wings and are provided with pivotable nozzles so that the main propulsion units may be used for the generation of forward thrust and also for the production of vertical thrust. In FIGURE 1, the jet nozzles are shown in the position for the production of vertical thrust.

The nacelles 4 are mounted at the wing tips and the vertical propulsion units 5 are enclosed therein. Either a single unit or a plurality of such vertical propulsion units may be provided in each nacelle. These vertical propulsion units are designed to produce vertical thrust only for use in VTOL operations.

As will be seen from FIGURE 1, if, e.g. a total failure of the left hand vertical propulsion unit 5 occurs, a thrust asymmetry will be produced and also a dangerous rolling moment because of the long lever arm, which corresponds to half of the wingspread. These same considerations also apply, of course, in the case of failure of one of the propulsion units 3. The present invention may also be used in the situation where the primary propulsion units 3 are used only for the purpose of generating the actual forward thrust while the vertical propulsion units 5 must produce all of the required vertical thrust.

FIGURES 2 and 3 schematically show one arrangement of the vertical propulsion units in a nacelle. The two vertical propulsion units 5 and 5' are vertically mounted in the nacelle 4 and are arranged in series in the direction of flight. The containers 6, 6', 6", and 6'" are also mounted in the same nacelle and are housed in compartments therein. The suspension or mounting arrangements for the containers are designated by the numeral 7. The containers may be of different sizes and preferably contain the aircraft fuel. Where the containers contain the fuel, the suspension system 7 advantageously includes a fuel line which is not shown in detail in the drawings. The embodiment of FIGURES 2 and 3 illustrates the case where the containers are provided in a number exceeding that of the vertical propulsion units and the weight of each container is less than the thrust produced by one vertical propulsion unit 5 or 5'. If, for example, the vertical propulsion unit 5 becomes inoperative as a result of a malfunction, one or more of the containers 6 and 6' may be jettisoned as required. Due to the reduction in weight, the loss of thrust is compensated and the rolling moment generated is equalized. This arrangement may also be advantageously used if, for example, the vertical propulsion unit 5 does not become totally inoperative but exhibits only a substantial loss of thrust. In such a case, jettisoning of one container may suffice to achieve the desired compensation. Not only the weight of the jettisoned containers and their contents is a factor in compensating for the rolling moment but also the length of the lever arm is important, in the same manner as the mounting of the vertical propulsion units.

FIGURES 4 and 5 correspond, with regard to the arrangement of the vertical propulsion units 5 and 5', to the arrangement shown in FIGURES 2 and 3.

In FIGURES 4 and 5, however, only two containers 8 and 8' are provided for the two vertical propulsion units although it will be appreciated that additional propulsion units may be employed if desired. The weight of each of the containers 8 and 8' and the other aircraft components is sufficiently less than the total thrust of the propulsion units so that a net vertical thrust results for take-off. In hovering flight, thrust and weight are in balance. The shape of each container is selected so that it exhibits good air-flow characteristics. The containers, together with the vertical propulsion units, have the same form as the nacelle illustrated in FIGURE 2.

After the container 8 and/or 8' has been jettisoned, the vertical propulsion units 5 and 5' remain in a fixed nacelle which, due to the configuration of the front and rear fairings 4' and 4" thereof, is also a body of streamlined air-flow characteristics. In this case, the containers complement the shape of the nacelle housing the vertical propulsion units to form a composite nacelle having good air-flow characteristics. The attachments for the containers are illustrated by the numeral 9, the attachments also containing fuel line connections.

The jettisoning of the containers may be effected by mechanical or electrical actuation of a locking mechanism and they may drop off due to their own weight. The containers may also be jettisoned with the aid of other means, such as, for example, compressed air or explosive means as are conventionally used in other parts of aircraft. Where the containers are used as fuel tanks, care must be observed that the fuel lines separated during jettisoning are automatically closed. This also applies to compressed gas or compressed air lines where employed. Means for effecting such closures are, however, known to the art and are not specifically illustrated. At the moment the container is jettisoned, a fire and explosion preventing means may be released in the jettisoned container in order to eliminate the danger of an explosion or fire upon impact of the container with the ground.

The present invention may be utilized in all aircraft in which vertical thrust is generated by downwardly directed gas jets. It may thus be used in the case of failure of a specific vertical propulsion unit as well as in the case of failure of a primary propulsion unit used for the generation of forward thrust as well as vertical thrust. It can also be employed in designs wherein pivotable propulsion units are mounted on the wings. In all of these cases, compensation of the rolling moment is achieved by the decrease in weight when jettisoning the containers, also taking into account the lever arms for the propulsion units and the containers. Even though complete symmetry is not obtainable in all cases, the compensation is immediately achieved or at least restored to a degree such that the dangers of the rolling moments are eliminated. The remaining slight thrust asymmetry, as may also occur under other circumstances during operation, can then be easily compensated using existing conventional control means.

It will be obvious to those skilled in the art that many modifications may be made within the scope of the present invention without departing from the spirit thereof, and the invention includes all such modifications.

What is claimed is:

1. A jet aircraft having vertical propulsion units mounted on the wings symmetrically to the longitudinal axis of the aircraft, the units each having at least one jettisonable container mounted adjacent thereto, whereby a reduction in thrust of at least one propulsion unit can be at least partially compensated by jettisoning at least one container and rolling moments of the aircraft are reduced.

2. An aircraft according to claim 1 in which the number of the containers corresponds to the number of vertical propulsion units and the weight of each container, and contents thereof, is less than the maximum thrust produced by one vertical propulsion unit.

3. An aircraft according to claim 1 in which the number of containers exceeds the number of vertical propulsion units and the weight of each container, and contents thereof, is less than the thrust produced by one vertical propulsion unit.

4. An aircraft according to claim 1 in which each vertical propulsion unit and container mounted adjacent thereto are mounted in nacelles.

5. An aircraft according to claim 1 in which each vertical propulsion unit and container mounted adjacent thereto are enclosed in an integral nacelle fairing.

6. An aircraft according to claim 1 in which each container has a streamlined shape which complements a streamlined shape of a separate adjacent nacelle for the vertical propulsion unit.

References Cited by the Examiner

UNITED STATES PATENTS

| | | | |
|---|---|---|---|
| 2,069,996 | 2/1937 | Carleton et al. | 244—135 |
| 2,665,093 | 1/1954 | Manfredi et al. | 244—139 |
| 2,954,944 | 10/1960 | Huet | 244—12 |
| 3,035,797 | 5/1962 | Neuschotz | 244—135 |
| 3,066,889 | 12/1962 | Kelly | 244—12 |
| 3,089,666 | 5/1963 | Quinzler | 244—7 |
| 3,098,632 | 7/1963 | Christenson | 244—135 |

MILTON BUCHLER, *Primary Examiner.*

FERGUS S. MIDDLETON, *Examiner.*